Jan. 7, 1969 J. P. VANIER 3,420,996

ATOMIC BEAM MASER HAVING IMPROVED ENERGY STATE SELECTION TO PROVIDE INCREASED SHORT TERM STABILITY

Filed Aug. 8, 1966

INVENTOR.
JACQUES P. VANIER

BY Wm J Nolan

ATTORNEY 3,420,996

ATOMIC BEAM MASER HAVING IMPROVED ENERGY STATE SELECTION TO PROVIDE INCREASED SHORT TERM STABILITY

Jacques P. Vanier, Beverly, Mass., assignor, by mesne assignments, to Hewlett-Packard Company, Palo Alto, Calif., a corporation of California Filed Aug. 8, 1966, Ser. No. 571,092
U.S. Cl. 250—41.3 5 Claims
Int. Cl. H01s *1/00;* G01n *27/78*

ABSTRACT OF THE DISCLOSURE

The atomic beam in a maser apparatus is passed through an energy state selecting system which inverts undesired field dependent atoms from the upper to the lower hyperfine energy state and removes these atoms from the beam. Inversion is achieved by subjecting the atoms to a D.C. magnetic field reversal. Only the desired field independent atoms reach the maser storage bulb, so that power output is increased by a factor of about 200 and short term frequency stability is increased by a factor of about 14.

Figures 1, 2, 3:
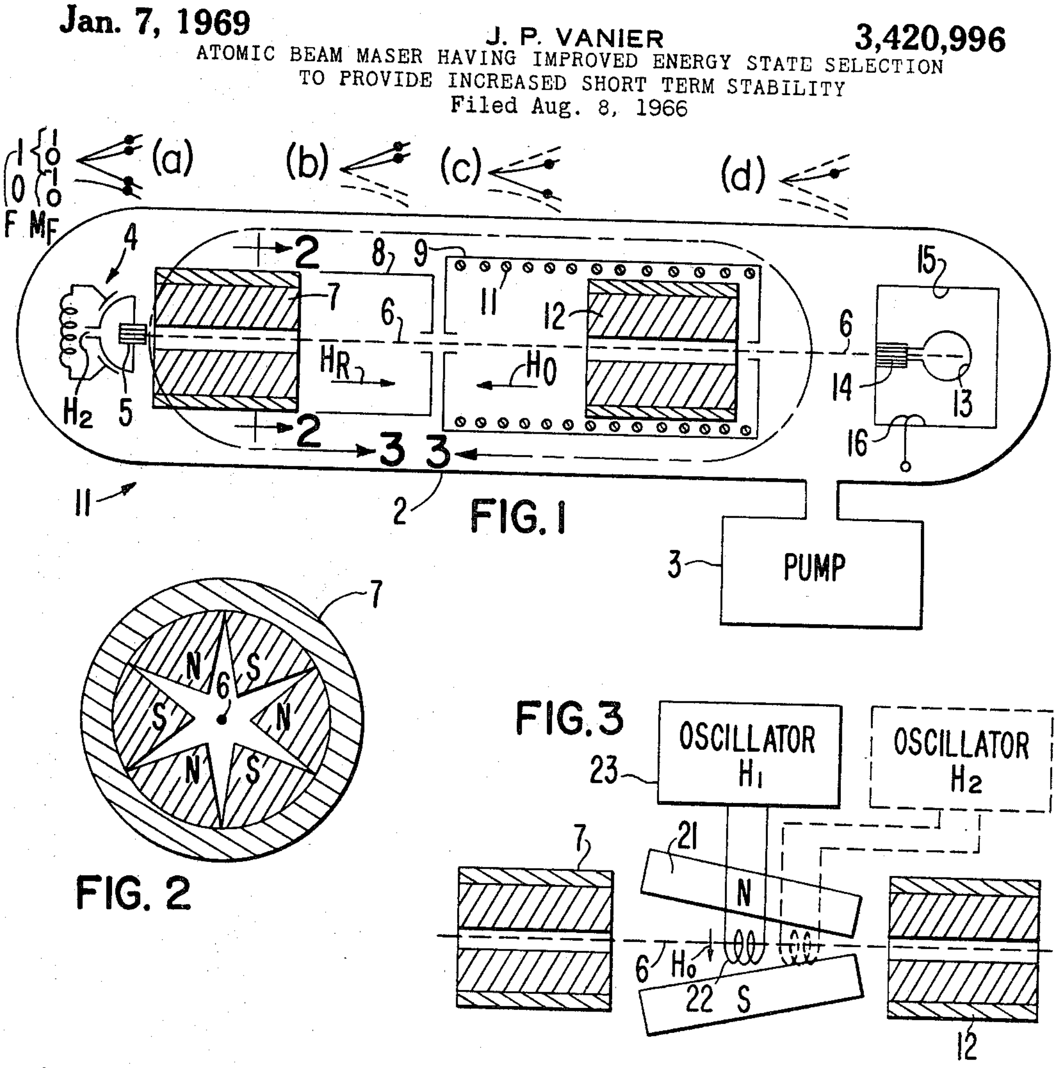

The present invention relates in general to atomic beam type masers and more particularly, to an improved beam maser having increased power output and short term frequency stability provided by improved energy state selection. Improved masers of the present invention are especially useful where it is desired to measure phase shift over a very short interval of time such as for example when measuring the phase shift in the return echo signal in certain radars.

Heretofore atomic beam masers have been built such as hydrogen beam masers. Such masers have had a power output of on the order of $4\times10^{-13}$ watts and provided a short term frequency stability of a few parts in 10″ over a time period of $10^{-2}$ seconds. It has been found that the short term stability is proportional to the square root of the power output of the maser. It has also been found that the power output of the maser, and thus its short term stability, was limited in the prior masers due to the limitations of the energy state selecting system.

The prior masers employed a hexapole magnet for deflecting out of the beam certain low energy atoms. However, the hexapole magnet is unable to focus out of the beam, containing the desired $F=1$, $m=0$ states, certain magnetic field dependent energy states such as the unwanted $F=1$, $m=+1$ state. As a consequence only half of the beam flux entering the maser cavity could contribute power to the maser oscillations.

It turns out that if the ratio of useable beam flux to the total beam flux entering the maser cavity can be increased that the power output of the maser can be substantially increased as by, for example, a factor of 200. This will substantially increase the short term stability of the maser by about a factor of 14.

In the present invention an improved energy state selecting system is provided for retaining in the beam essentially only atoms which will make a useful contribution to the maser oscillations. As a consequence the power output and, thus, the short term stability of the atomic beam maser are substantially increased. The improved energy state selecting system includes a conventional energy state selector magnetic field for selecting and, thus, retaining the field dependent and field independent upper hyperfine energy states. The undesired upper hyperfine energy state field dependent atoms are then caused to suffer an inversion to a lower hyperfine energy state such as, for example, by an adiabatic field reversal or a fast passage. The unwanted field dependent energy state atoms are then focused out of the beam, while retaining the desired upper energy state field independent atoms, by passing the beam through a second energy state selecting magnetic field. This improved energy state selecting then permits a substantial increase in the beam flux supplied to the maser cavity. The conventional maser storage bulb and cavity resonator may be employed but with an increase in the pumping speed of the vacuum pumps to handle the increased total beam flux.

The principal object of the present invention is the provision of an improved energy state selecting system for atomic beams and improved atomic beam masers using same.

One feature of the present invention is the provision of an improved energy state selecting system for atomic beams wherein the field dependent upper hyperfine energy state atoms of an energy state selected beam are caused to undergo a population inversion followed by a second energy state selection to remove the field dependent hyperfine atoms, whereby the percentage of useable field independent upper energy state hyperfine atoms in the beam is substantially increased.

Another feature of the present invention is the same as preceding wherein the population inversion is obtained by an adiabatic field reversal or by a fast passage.

Another feature of the present invention is the same as any one or more of the preceding wherein the atoms of the beam are selected from the class consisting of H, Cs, Rb, Tl, K, and Na.

Another feature of the present invention is the same as any one or more of the preceding wherein the atoms of the beam are selected from the class consisting of H, Cs, Rb, Tl, K, and Na.

Another feature of the present invention is the same as any one or more of the preceding wherein the energy state selector includes a pair of axially spaced hexapole magnets.

Figure 4:
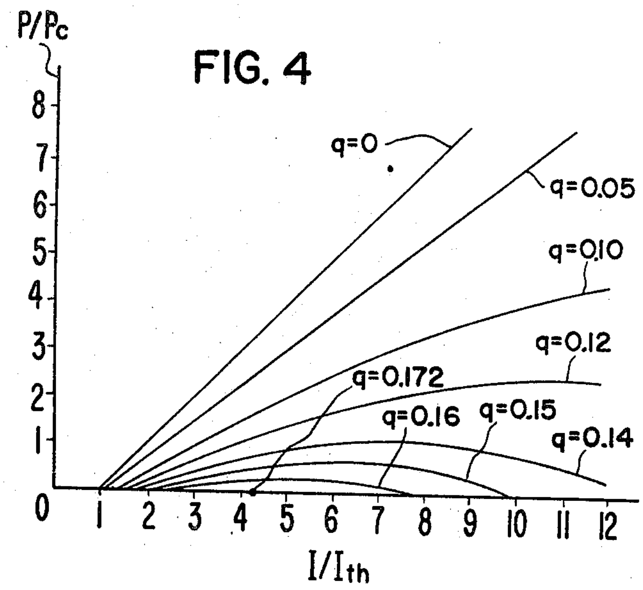
Figure 5:
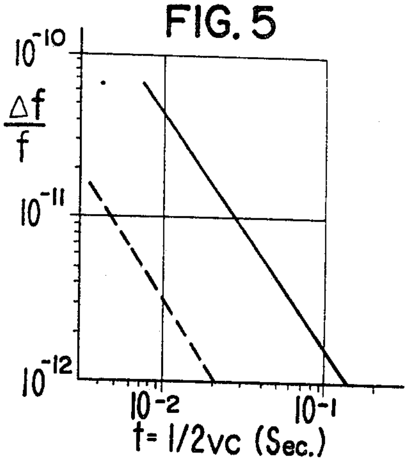

Other features and advantages of the present invention will become apparent upon a perusal of the following specification taken in connection with the accompanying drawings wherein:

FIG. 1 is a schematic line diagram of an atomic beam maser employing features of the present invention, FIG. 2 is a sectional view of the structure of FIG. 1 taken along line 2—2 in the direction of the arrows, FIG. 3 is a schematic diagram, partly in block diagram form, of an alternative embodiment of a portion of the structure of FIG. 1 delineated by line 3—3, FIG. 4 is plot of a ratio of power output of a hydrogen maser versus a ratio of beam flux as a function of different values of $q$ where these are defined in the specification, and FIG. 5 is a plot of frequency stability versus measuring time for a prior art maser and a maser of the present invention.

Referring now to FIG. 1 there is shown an atomic beam maser tube 1 of the present invention. The tube 1 includes a vacuum envelope 2 enclosing the elements of the tube and being evacuated to a low pressure of on the order of $10^{-6}$ to $10^{-8}$ torr via a vacuum pump 3. A suitable source 4 of atomic beam material such as a radio frequency discharge dissociator for an atomic hydrogen beam or a suitable oven source for other materials such as Cs, Rb, Tl, K, or Na is disposed at one end of the tube 1. A beam collimator 5 is disposed on the output end of the source 4 to form a well collimated beam of atomic particles 6.

A first state selecting magnet assembly 7 such as a hexapole, quadrupole or dipole magnet, shown in section in FIG. 2, produces a magnetic gradient across the beam 6 for deflecting out of the beam certain atoms with unwanted lower energy states. More particularly, the atoms emerge from the source 4 with their various upper and lower energy states populated as shown in the energy level diagram labeled (*a*). The first state selecting magnet deflects out of the beam all atoms having energy states lower than the desired field independent upper hyperfine level which for hydrogen is the $F=1$, $m=0$ level.

However, this still leaves in the beam 6 certain atoms which populate the upper field dependent hyperfine levels known as Zeeman levels as shown by energy level diagram labeled (*b*). The field dependent hyperfine energy states do not contribute to the desired field independent maser transition which is to be excited in the maser cavity. Thus, it is desired to rid the beam of the atoms in these field dependent upper energy levels. In the present invention this is achieved by inverting the populations of the field dependent upper hyperfine energy levels and then passing the beam through a second state selecting magnetic field to deflect out of the beam the inverted energy state atoms while retaining only the desired atoms in the upper hyperfine energy field independent levels.

In the apparatus of FIG. 1, the population inversion of the field dependent levels is obtained by causing the atoms to experience an adiabatic field reversal. In an adiabatic field reversal the atoms are caused to pass from a first region of the beam having a first axial magnetic field into a second region of the beam having a second axial magnetic field directed in the opposite direction (reversed) to the field in the first region. The transition of the atoms from the first region to the second region should take place in a time shorter than the time it takes the atoms to make one cycle of their gyromagnetic precession frequency in the field of said first region. In the case of hyperfine atoms the gyromagnetic precession frequency of interest is the impaired electron precession frequency of 1.4 mHz./gauss.

Thus, the adiabatic field reversal apparatus of FIG. 1 includes a first cylindrical magnetic shield 8 as of permalloy coaxially surrounding the beam path 6 and having closing end wall portion for reducing the axial component $H_r$ of the residual earth's field to about 10 milligauss inside the shield 8. A second cylindrical magnetic shield 9 having end closing shield wall member is disposed downstream of the first shield 8. The second shield 9 includes a solenoid 11 for producing a low field therein of on the order of, for example, 10 milligauss which is axially directed in a direction opposite to the field in the first region. The shields 8 and 9 are apertured with small openings in alignment with the beam path 6 to allow the beam 6 to pass through the shields.

The shields 8 and 9 are spaced apart by a distance on the order of 1 inch or less to define the beam transition region within which the beam particles pass from the first region into the second. The magnetic field in the transition region is less than that in either of the first or second regions. As pointed out above, the beam particles pass through the transition region in a time less than it takes the atoms to make one precession cycle at 1.4 mHz./gauss in the low field of the first region (10 milligauss for the example given). As a consequence of the adiabatic field reversal the population of the upper hyperfine field dependent levels is inverted as shown by the energy level diagram labeled (*c*).

A second energy state selecting magnet assembly 12 substantially identical to the first magnet assembly 7 is disposed inside the second shield 9 in the region of the reversed field. The second energy state selecting magnet produces a gradient across the beam 6 which deflects out of the beam 6 the atoms in the inverted field dependent energy levels, leaving in the beam 6 only the desired field independent upper hyperfine energy state atoms as shown by the energy level diagram labeled (*d*). These atoms of the beam 6 are then projected into the conventional storage bulb 13 via an input beam collimator

14 for interaction with the radio frequency fields of a surrounding high Q cavity resonator 15 which is tuned to the field independent hyperfine transition or resonance frequency. The cavity 15 is typically dimensioned and arranged for excitation of a desired $TE_{0,1,1}$ mode and there is produced a net power flow at the field independent hyperfine frequency from the beam to the cavity. An output coupling device, such as coupling loop 16 is provided in the cavity 15 for coupling power out to a load, not shown. The loop 16 has been turned 90° for simplicity of explanation. In the case of H atoms the inside of the bulb 13 is conveniently coated with a non-relaxing coating such as Teflon. However, for Cs and Rb, the coating is preferably $(CH_3)_2SiCl_2$ (Dry Film marketed by General Electric Inc).

Referring now to FIG. 3 there is shown an alternative apparatus for inverting the population densities of the field dependent hyperfine energy states. In this apparatus the energy states are inverted by means of a fast passage. More particularly, a dipole magnet 21 is disposed straddling the beam path 6 with the transverse spacing between the poles of the magnet changing in the direction of the beam path 6. This magnet configuration produces a magnetic field gradient along the beam path 6. A radio frequency coil 22 is axially aligned with the beam path 6 to produce an alternating magnetic field component at right angles to the direction of the transverse magnetic field produced by the magnet 21. The coil 22 is preferably located centrally of the magnet 21 at a position corresponding to a transverse magnetic field intensity $H_0$ as of 10 gauss which is the average transverse field intensity produced by the magnet 21 along the beam path 6. An oscillator 23 drives the coil 22 with an alternating current at a frequency as of 10 mHz. corresponding to the electron gyromagnetic resonance frequency of the atoms at the average transverse magnetic field intensity $H_0$. The intensity of the alternating magnetic field $H_1$ is selected to produce a 180° precession of the electrons of the field dependent energy state atoms during the time the atoms take to pass through the region of the alternating magnetic field $H_1$. This condition is satisfied when $$\gamma H_1 T_{int} = \pi$$

where $\gamma$ is the electron magnetogyric ratio $T_{int}$ is the time of the interaction. The 180° precession serves to invert the populations of the field dependent energy states to a condition as shown by the energy level diagrams labeled (c) in FIG. 10. Such a system for producing an adiabatic fast passage for a hydrogen beam is described by Abragam et al. in Comptes Rendus, Academie des Sciences, Aug. 6, 1962 at p. 1099.

In the case of H atoms only one coil 22 and oscillator 23 are required since there is only one undesired field dependent energy level to invert. However, in the case of Rb, Cs, K, Na and Tl additional energy levels having different precession frequencies are involved and therefore additional coils 22 and oscillators are required for successive interaction in the magnetic field gradient, as indicated by the dotted coil and oscillator of FIG. 3. These additional oscillators are tuned to the respectively different Zeeman transition frequencies and the magnitude of the alternating magnetic fields produced by the coils adjusted to produce the 180° rotation about the applied alternating field component during the time the atoms pass through the respective alternating field region.

Once the populations of the field dependent Zeeman levels have been inverted the beam is passed through the second energy state selecting magnet 12 to deflect out of the beam 6 the field dependent energy states in the manner as previously described with regard to FIG. 1.

A more detailed analysis of why elimination of the field dependent energy levels leads to much higher maser power output and short term frequency stability follows: The short term stability of an atomic beam maser, where stability is defined as the ratio of R.M.S. frequency deviation $\Delta f$ over the operating frequency $f$, i.e., $\Delta f/f$ is related to the power output of the maser as follows $$\frac{\Delta f}{f} \alpha \frac{1}{\sqrt{P}} \quad (1)$$

Actually the maser output is correctly represented by a narrow band of energy centered around a frequency $\nu_0$ and superimposed on a large background of noise. This noise finds its origin in the cavity itself which being at a given temperature acts as a source of radiation characteristic of its own frequency bandwidth. It is thus clear that any means of increasing the energy delivered by the atom relative to the noise power of the system will produce a spectrum which is defined better in terms of frequency and which will exhibit a better short term stability characteristic.

The present limitation of the prior art masers exists in the fact that for a given geometry of storage bulb, cavity and selecting magnet there is a minimum and maximum atomic flux at which the maser operates. These two fluxes are given by $$\frac{I_{\text{max, min}}}{I_{\text{th}}} = \frac{1-3q\pm(1-6q+q^2)^{1/2}}{4q^2}$$

where $$q = \frac{\sigma \bar{v}_r \hbar}{8\pi\mu_0^2} \frac{V_c}{\eta V_b} \frac{1}{Q} \frac{I_{\text{tot}}}{I} \frac{\gamma_t}{\gamma_b}$$

in which $\sigma$ is the spin exchange cross section, $\bar{v}_r$ is the relative velocity of the atoms, $\hbar$ is Planck's constant over $2\pi$, $V_c$ the volume of the cavity, $\gamma_t$ the total relaxation rate, $\gamma_b$ the bulb relaxation rate, $\mu_0$ the Bohr magnetron, $\eta$ the filling factor, $V_b$ the volume of the bulb, Q the quality factor of the cavity, and $I_{tot}/I$ the ratio of the total flux entering the bulb to the flux producing the oscillation.

It is clear that between the minimum and maximum fluxes possible there is a maximum of power possible and this is shown on FIG. 4. On this figure the term $P_c$ stands for $$P_c = \frac{1}{2} h\nu I_{\text{th}}$$

when $I_{th}$ is the minimum flux for oscillation in the case where spin exchange interactions are negligible and $\nu$ is the hyperfine frequency of hydrogen.

An improvement in power can be obtained by making $I_{th}$ large; this has the effect of scaling up FIG. 4 by increasing $P_c$. It is seen, however, from this figure that the maximum power output is a sharp function of $q$ and the smaller the $q$ is, the more power is available. In the prior art hydrogen maser $q$ is of the order of 0.14 and is mostly limited by the ratio $I_{tot}/I$; this ratio for the present hexpole focusing magnet has a minimum of 2.

An improvement in the quality factor $q$ can be obtained by reducing $I_{tot}/I$ to 1 in the manner as described above with regard to FIGS. 1–3.

The net result is that $$\frac{I_{\text{tot}}}{I} = 1$$

The quality factor $q$ is reduced by a factor of 2 and a considerable increase in power is possible due to the possibility of increasing the atomic beam flux to some value corresponding to $P/P_c$ of about 30 corresponding to an increase in power output by a factor of about 200.

The system would use increased pumping speed for the pump 3 compared to the prior art and higher beam flux. The hydrogen dissociator can be either a high power discharge or a hot tungsten filament. Both these systems are known to produce large quantities of atomic hydrogen.

The resultant increase in frequency stability is about a factor of 14 as shown on the plot of FIG. 5 where the dotted line represents the improved atomic beam maser of the present invention.

Since many changes could be made in the above construction and many apparently widely different embodiments of this invention could be made without departing from the scope thereof, it is intended that all matter contained in the above description or shown in the accompanying drawings should be interpreted as illustrative and not in a limiting sense.

What is claimed is:

1. An atomic beam maser apparatus including means for forming and projecting a beam of atoms over an elongated predetermined beam path; means forming an energy state selector disposed along said beam path for deflecting out of the beam path certain field dependent hyperfine energy state atoms; means forming a resonant circuit disposed along said beam path downstream of said energy state selecting means for extracting a net power flow at a field independent hyperfine resonance frequency from said beam to produce an output signal; and wherein said energy state selector means includes a first hyperfine atom deflecting magnet, a second hyperfine energy state deflecting magnet disposed downstream of said first deflecting magnet, and means disposed along said beam path intermediate said first and second deflecting magnets for inverting the m-states of only the field dependent atoms in the upper hyperfine Zeeman sublevels, said m-state inverting means including means for producing a D.C. magnetic field reversal, whereby said field dependent hyperfine atoms are deflected out of said beam path by said second deflecting magnet to increase the percentage of field independent upper hyperfine energy state atoms in said beam which passes into said resonant circuit means.

2. The apparatus of claim 1 wherein said means for producing an adiabatic field reversal comprises, a first magnetic shield for reducing the axial D.C. magnetic field directed along the beam path to a first value, a second magnetic shield disposed downstream of said first shield for shielding a downstream portion of said beam, and means for producing an axial magnetic field of a second value directed along the beam path in said second shield and which is opposed to the direction of the axial magnetic field in said first shield, and means for shielding the beam path in the region between said first and second magnetic shields, and wherein the spacing between said first and second shielded regions of said beam is sufficiently short such that atomic beam particles pass through the shielded region of the beam between the first and second regions in a time less than the time for one cycle of the precession frequency of the atoms where the precession frequency is 1.4 mHz. times the average magnitude in gauss of the axial magnetic field in the first shielded region.

3. The apparatus of claim 1 wherein said atomic beam is formed of atoms selected from the class consisting of H, Rb, Cs, K, Tl and Na.

4. The apparatus of claim 1 wherein said beam of atoms is selected from the class consisting of H, Cs, and Rb.

5. The apparatus of claim 1 wherein said beam of atoms is hydrogen atoms.

References Cited

UNITED STATES PATENTS

| | | | |
|---|---|---|---|
| 3,255,423 | 6/1966 | Ramsey et al. | 331—94 |
| 3,328,633 | 6/1967 | George | 315—111 |

WILLIAM F. LINDQUIST, *Primary Examiner.*

U.S. Cl. X.R.

330—4